UNITED STATES PATENT OFFICE.

FRANCIS T. SARGENT, OF NEW YORK, N. Y.

PROCESS OF ORNAMENTING GLASS.

SPECIFICATION forming part of Letters Patent No. 240,770, dated April 26, 1881.

Application filed November 18, 1879.

*To all whom it may concern:*

Be it known that I, FRANCIS T. SARGENT, of New York city, county, and State, have invented a new and Improved Process for Ornamenting Glass; and I do hereby declare the following to be a full and exact description of the invention, which will enable others skilled in the art to which it appertains or with which it is most closely connected to make use of the same.

My invention has for its object to produce a cheap substitute for the expensive colored glass now so extensively used for advertising-signs and other purposes; and it consists, primarily, in a new process, to be hereinafter more fully described, for imparting to ordinary plain or ground glass the appearance of ornamented colored glass; and, secondly, in a new article of manufacture—namely, the product of the process alluded to.

In carrying my improved process into practice I take gelatine and impart to it any desired shade or tint of color by means of any coloring-matter that will dissolve thoroughly in water without leaving a grain, or, in other words, that will form a perfectly-clear solution. The colored gelatine is then sensitized in the usual manner for photography and flowed evenly over the surface of the glass it is intended to ornament. When the coating has thoroughly dried a negative of the design to be produced is placed over it, and the whole is then placed in a printing-frame and exposed to the sun's rays, and after a sufficient exposure is washed out in the usual manner to remove the parts of the gelatine not affected by light and leave the other parts. It is then allowed to dry. The surface is next covered with dammar varnish, or a like coating, which, when dry, prevents its being affected by water.

Plain glass surfaces can thus be prepared with any design and in any color at a trifling cost, and with little labor, compared with the production of the same design in ordinary colored glass.

I am aware that it is not new in the art of photography to print pictures upon glass plates covered with colored and sensitized gelatine by means of photographic negatives and a washing process, and such I do not, therefore, broadly claim; but What I do claim as my invention is—

1. The herein-described process of ornamenting glass in imitation of colored or stained glass—namely, by coating the glass with a film of colored sensitized gelatine, printing upon said sensitized film by means of a negative and exposure to light the design to be reproduced, washing away the parts not affected by light, and, finally, applying a coating of varnish, substantially as set forth.

2. As a new article of manufacture, signs, ornaments, &c., consisting of glass surfaces having colored gelatine designs permanently affixed thereto, substantially in the manner described.

FRANCIS T. SARGENT.

Witnesses:
GEO. D. ALLEN,
MAY A. SARGENT.